United States Patent
Hosokawa (10) Patent No.: US 7,912,826 B2
(45) Date of Patent: Mar. 22, 2011

(54) APPARATUS, COMPUTER PROGRAM PRODUCT, AND METHOD FOR SUPPORTING CONSTRUCTION OF ONTOLOGIES

(75) Inventor: Akira Hosokawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 443 days.

(21) Appl. No.: 12/051,435

(22) Filed: Mar. 19, 2008

(65) Prior Publication Data

US 2009/0077074 A1    Mar. 19, 2009

(30) Foreign Application Priority Data

Sep. 13, 2007  (JP) ................. 2007-237794

(51) Int. Cl.
*G06F 17/30* (2006.01)
*G06F 17/00* (2006.01)
(52) U.S. Cl. ......... 707/705; 707/790
(58) Field of Classification Search ....... 707/999.1–102, 707/705, 790; 706/45–48, 59, 61
See application file for complete search history.

(56) References Cited

U.S. PATENT DOCUMENTS 7,496,593 B2 * 2/2009 Gardner et al. ................ 1/1
7,685,088 B2 * 3/2010 Zhang et al. ............... 706/61

FOREIGN PATENT DOCUMENTS

JP    2001-014166    1/2001

* cited by examiner

*Primary Examiner* — Yicun Wu
(74) *Attorney, Agent, or Firm* — Turocy & Watson, LLP (57) ABSTRACT

To construct an ontology for a target data by re-using an existing ontology, from an aspect of the structure of the class hierarchy according to an object-oriented method and an aspect of the levels of relevance with other properties, the properties that correspond to the data items in the data serving as an ontology construction target and the extraction classes of the properties are determined as property extraction destination candidates for the ontology to be constructed. As a result, it is possible to re-use even a fine difference in the meanings among the properties in the classes. Consequently, it is possible to provide a support for constructing an effective ontology, while reducing the load on the user.

10 Claims, 9 Drawing Sheets

| CLASS ID | PARENT CLASS ID |
|---|---|
| X1 | |
| X2 | X1 |
| X3 | X1 |
| X4 | X2 |
| ≈ | ≈ |
| X15 | X7 |
| Y1 | |
| Y2 | Y1 |
| ≈ | ≈ |
| Y7 | Y3 |

31

| CLASS ID | NAME |
|---|---|
| X1 | AAAAA |
| X2 | BBBBB |
| X3 | CCCCC |
| X4 | DDDDD |
| ≈ | ≈ |
| X15 | OOOOO |
| Y1 | TTTTT |
| Y2 | UUUUU |
| ≈ | ≈ |
| Y7 | ZZZZZ |

| CLASS ID | PARENT CLASS ID |
|---|---|
| x1 | |
| x2 | X1 |
| x3 | X1 |
| ≈ | ≈ |
| x15 | X7 |
| y1 | |
| y2 | Y1 |
| ≈ | ≈ |
| y7 | Y3 |

41

| CLASS ID | NAME |
|---|---|
| x1 | aaaaa |
| x2 | bbbbb |
| x3 | ccccc |
| ≈ | ≈ |
| x15 | ooooo |
| y1 | ttttt |
| y2 | uuuuu |
| ≈ | ≈ |
| y7 | zzzzz |

| z2 | z4 | z5 | z7 | z8 |
|---|---|---|---|---|
| 2.8 | 1 | TS-1 | abc | 10 |
| 4.6 | 2 | TS-2 | xyz | 15 |

FIG.9

| DATA ITEM | PROPERTY THAT CAN CORRESPOND |
|---|---|
| z2 | x2, y2 |
| z4 | x4, y4 |
| z5 | x5, y5 |
| z7 | x7, y7 |
| z8 | x8 |

FIG.10

| DATA ITEM | PROPERTIES THAT CAN CORRESPOND | EXTRACTION CANDIDATE CLASS |
|---|---|---|
| z2 | x2, y2 | X2, X4, X5, X8, X9, X10, X11, Y2, Y4, Y5 |
| z4 | x4, y4 | X4, X8, X9, Y4 |
| z5 | x5, y5 | X5, X10, X11, Y5 |
| z7 | x7, y7 | X7, X14, X15, Y7 |
| z8 | x8 | X8 |

| DATA ITEM | EXTRACTED PROPERTY | EXTRACTION CLASS |
|---|---|---|
| z2 | x2 | X8 |
| z4 | x4 | X8 |
| z5 | | |
| z7 | | |
| z8 | x8 | X8 |

FIG.13

| DATA ITEM | EXTRACTED PROPERTY | EXTRACTION CLASS |
|---|---|---|
| z2 | x2 | X8 |
| z4 | x4 | X8 |
| z5 | x5 | X5 |
| z7 | | |
| z8 | x8 | X8 |

|  | z2 | z4 | z8 | z5 | z7 |
|---|---|---|---|---|---|
| CANDIDATE 1 | x2 (X8) | x4 (X8) | x8 (X8) | x5 (X5) | x7 (X7) |
| CANDIDATE 2 | x2 (X8) | x4 (X8) | x8 (X8) | x5 (X5) | x7 (X7) |

APPARATUS, COMPUTER PROGRAM PRODUCT, AND METHOD FOR SUPPORTING CONSTRUCTION OF ONTOLOGIES

CROSS-REFERENCE TO RELATED APPLICATIONS

This application is based upon and claims the benefit of priority from the prior Japanese Patent Application No. 2007-237794, filed on Sep. 13, 2007; the entire contents of which are incorporated herein by reference.

BACKGROUND OF THE INVENTION

1. Field of the Invention

The present invention relates to an apparatus, a computer program product, and a method for supporting construction of ontologies.

2. Description of the Related Art

An ontology is a description of knowledge or a concept in a systematically classified manner. Each knowledge or each concept is represented as a class which is characterized by the set of properties. The classes of the ontology generally forms a classification hierarchy in which the properties of a direct superclass are inherited by its direct subclasses in an object-oriented manner. Here, the term "direct superclass(es)" indicates a parent class(es) of a class, and the term "superclass(es)" indicates its all ancestor class(es) including its parent class(es). In the same manner, the term "direct subclass(es)" indicates all child classes of a class, and the term "subclass(es)" indicates its all descendant class(es) including its child class(es). Therefore, each class has both properties defined on the class and ones defined on its superclasses.

Each class can have a data set called "content data" each data in which is represented as a set of values of the properties of the class. One of the characteristics of such classification hierarchies is that the content data of a class can be browsed from its all superclasses. In this situation, from a superclass, it is possible to browse only the values of properties of the superclass.

In the object-oriented method, the meaning of a property is restricted by the class that uses the property, in addition to the meaning of the property itself. Another example of an element with which each class is characterized is that the properties belonging to mutually the same class are related to one another explicitly or implicitly. Thus, by designing the classes from an object-oriented aspect, it is possible to construct an effective ontology.

An example of an ontology that is expressed by using a class hierarchy is the Web Ontology Language (OWL), which is a technique recommended by the World Wide Web Consortium (W3C) and is used for systematically expressing vocabulary and/or knowledge in the web and the relationships among the vocabulary words or the knowledge pieces. The OWL expresses an inferable class system of vocabulary, based on the syntax of a Resource Description Framework (RDF).

An example of an ontology is International Organization for Standardization (ISO) 13584/Parts Library (PLIB), which is an International Standard related to electronic catalogues of industrial products and component parts. In PLIB, schemas for describing classes and properties such as "BSU code" and "preferred name" are defined. Meta data of the classes and the properties are written according to the schemas. An ontology that has been structured as described above may be called a "data dictionary". The content data are written according to the data dictionary.

In industry, some ontologies are made and distributed for e-business. When a number of corporations write data based on a commonly-used ontology, all the users that refer to the ontology are able to share the meanings related to the data. As a result, it is expected that the persons in charge are able to save the time and the energy they spend exchanging information among themselves frequently, so as to understand the meanings of the data. Further, conventionally, it has been necessary to convert data formats and values frequently, during the process of exchanging data among the corporations. However, if the corporations use the classes and the properties in the ontology that is commonly used among themselves, it is possible to save the time and the energy spent on the conversion process. In the explanation below, an ontology that can be referred to and used by a plurality of users like the one described above will be called "a standard ontology".

Generally speaking, from the aspect of consistency and neutrality, it is difficult to update a standard ontology itself unless all the users or the representatives of the users who are using the standard ontology agree on the update. Also, because each corporation often adds information unique to the corporation to the data that is dealt with in the corporation, it is difficult to fully express the data unique to each corporation by using a neutral standard ontology.

To cope with these situations, a method for constructing an ontology has been suggested in which properties that correspond to the data items in the data are extracted from a standard ontology so that the classes of the data are created by re-using the extracted properties. In this method, by re-using the standard ontology, all the users are able to share the same set of concepts in all the situations where the data is operated, such as when the data is created, when the data is browsed, and when the data is exchanged.

In most cases, the work of constructing a customized ontology (i.e., an ontology unique to the user) by re-using a standard ontology is done manually. However, to construct an ontology having a high level of precision, people need to be conversant with the standard ontology. Thus, one of the problems is that it is difficult for a person who is not one of the experts to construct the ontology. In addition, another problem is that the larger the number of data items that constitute the data is, the more time and energy it takes to select the properties that correspond to the data items.

To solve these problems, for example, in JP-A 2001-14166 (KOKAI), a method has been proposed in which data items are automatically brought into correspondence with an existing ontology, based on levels of similarity among names or the like.

However, according to the method disclosed in JP-A 2001-14166 (KOKAI), because the class hierarchy is not taken into consideration while the data items are brought into correspondence with the existing ontology, a problem remains where the information about the meanings given to the properties by the classes may be missing.

SUMMARY OF THE INVENTION

According to one aspect of the present invention, an ontology construction supporting apparatus includes an ontology information storing unit that stores one or more ontologies, each of the ontologies containing classes obtained by systematically classifying knowledge or a concept, and being capable of correlating data written according to a property as an attribute of the respective class with each of the classes; a data item extracting unit that extracts a data item from target data for an ontology construction accompanied by a plurality of data items; a candidate property extracting unit that extracts candidate properties corresponding to the data items, from the one or more ontologies; a candidate class extracting unit that extracts candidate classes each of which has one or more of the candidate properties, from the one or more ontologies; a primary property-selection determining unit that determines properties corresponding to the data items related to the target data for an ontology construction and extraction classes of the properties as ontology candidates, from a reference class determined according to priority levels among the candidate classes; and a secondary property-selection determining unit that, when there is a data item for which a corresponding property has not been determined by the primary property-selection determining unit, extracts classes each of which has one or more of the properties that have been determined by the primary property-selection determining unit using the class determined by the primary property-selection determining unit as the reference class, extracts, from the extracted classes, a class having a property corresponding to the data item for which the corresponding property has not been determined by the primary property-selection determining unit, and determines a property that corresponds to the data item for which the corresponding property has not been determined by the primary property-selection determining unit and an extraction class of the property, as ontology candidates.

According to another aspect of the present invention, an ontology construction supporting method includes storing one or more ontologies in a storing unit, each of the ontologies containing classes obtained by systematically classifying knowledge or a concept, and being capable of correlating data written according to a property as an attribute of the respective class with each of the classes; extracting a data item from target data for an ontology construction accompanied by a plurality of data items; extracting candidate properties corresponding to the data items from the one or more ontologies; extracting candidate classes each of which has one or more of the candidate properties from the one or more ontologies; determining properties corresponding to the data items related to the target data for an ontology construction and extraction classes of the properties as ontology candidates, from a reference class determined according to priority levels among the candidate classes; extracting classes each of which has one or more of the properties that have been determined by using the class as the reference class, when there is a data item for which a corresponding property has not been determined; extracting, from the extracted classes, a class having a property corresponding to the data item for which the corresponding property has not been determined; and determining a property that corresponds to the data item for which the corresponding property has not been determined and an extraction class of the property, as ontology candidates.

A computer program product according to still another aspect of the present invention causes a computer to perform the method according to the present invention.

DETAILED DESCRIPTION OF THE INVENTION

Exemplary embodiments of the present invention will be explained with reference to FIGS. 1 to 15.

Figure 1:
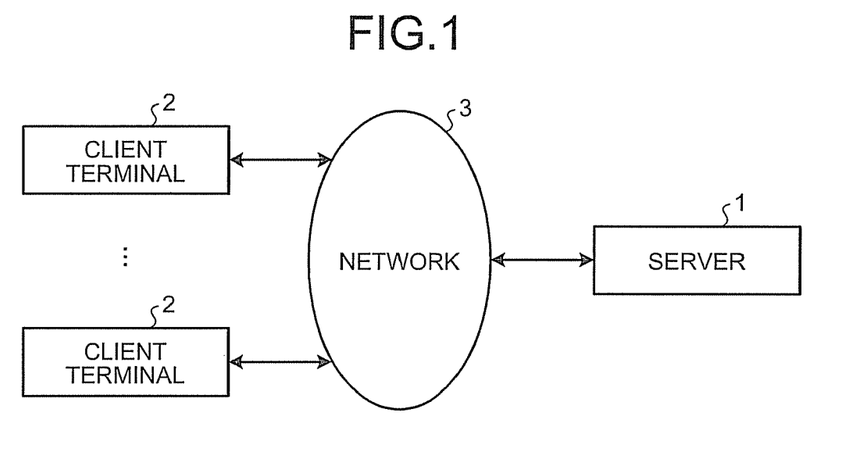
FIG. 1 is a schematic diagram illustrating an ontology construction supporting system according to an embodiment of the present invention.

FIG. 1 is a schematic diagram illustrating an ontology construction supporting system according to an embodiment of the present invention. As shown in FIG. 1, the ontology construction supporting system according to the present embodiment is assumed to be a client-server system in which a server computer (hereinafter, the "server") 1 and a plurality of client computers (hereinafter, the "client terminals") 2 are connected to each other via a network 3. Each of the client terminals 2 is, for example, a commonly-used personal computer.

The network 3 may be any type of network. For example, the network 3 may be a Local Area Network (LAN) or a public network. Also, although only one server 1 is connected to the network 3 in FIG. 1, the number of servers 1 that are connected to the network 3 is not limited. Another arrangement is acceptable in which the managed information and the functions are distributed to a plurality of servers 1 that collaborate with one another. Also, although only two client terminals 2 are connected to the network 3 in FIG. 1, the number of client terminals 2 that are connected to the network 3 is not limited.

Figure 2:
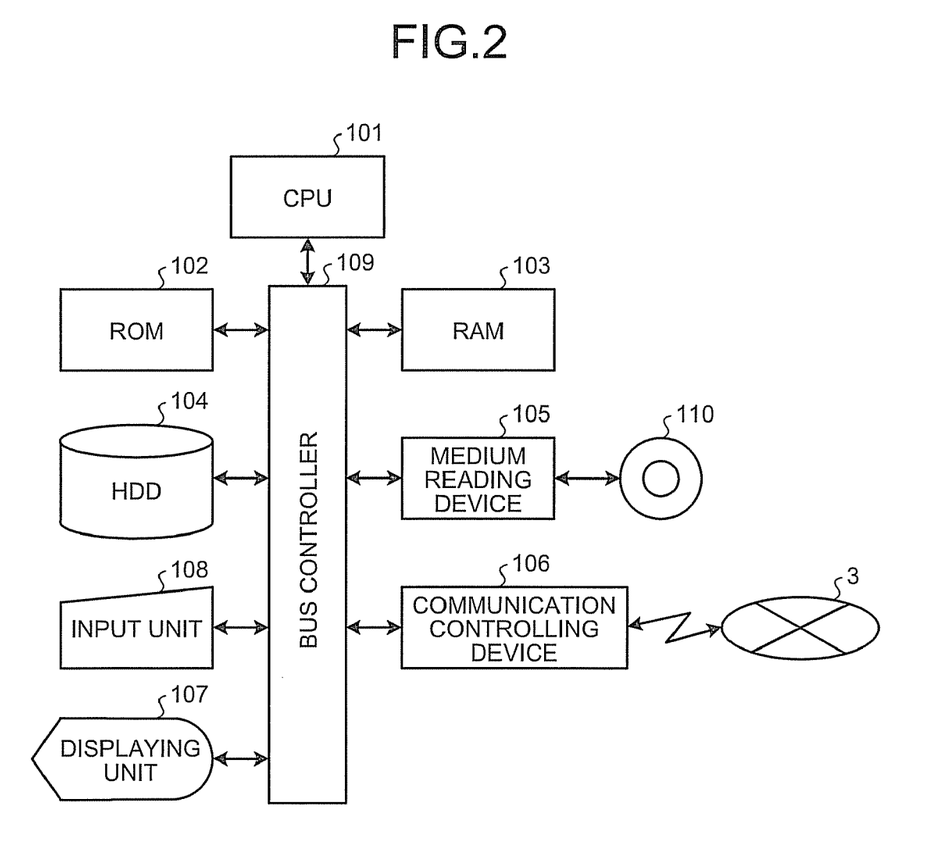
FIG. 2 is a diagram illustrating a module configuration of a server or a client terminal.

FIG. 2 is a diagram illustrating a module configuration of the server 1 or any of the client terminals 2. The server 1 and the client terminals 2 are each configured so as to include: a Central Processing Unit (CPU) 101 that performs information processing; a Read Only Memory (ROM) 102 that stores therein a Basic Input/Output System (BIOS) and the like; a Random Access Memory (RAM) 103 that stores therein various types of data in a rewritable manner, a Hard Disk Drive (HDD) 104 that functions as various types of databases and also serves as a storage unit storing therein various types of programs; a medium reading device 105 such as a Compact Disc Read-Only Memory (CD-ROM) drive used for storing information, distributing information to the outside of the server 1 or the client terminal 2, and obtaining information from the outside of the server 1 or the client terminal 2, via a storage medium 110; a communication controlling device 106 that transmits and receives information to and from other computers on the outside of the server 1 or the client terminal 2 through communication via the network 3; a displaying unit 107 such as a Cathode Ray Tube (CRT) or a Liquid Crystal Display (LCD) that displays progress and results of processing to an operator of the server 1 or the client terminal 2; and an input unit 108 that is a keyboard and/or a pointing device like a mouse used by the operator for inputting instructions and information to the CPU 101. The server 1 and the client terminals 2 each operate while a bus controller 109 arbitrates the data transmitted and received among these functional units.

In the server 1 and the client terminals 2, when the operator turns on the electric power, the CPU 101 runs a program that is called a loader and is stored in the ROM 102. A program that is called an Operating System (OS) and that manages hardware and software of the computer is read from the HDD 104 into the RAM 103 so that the OS is activated. The OS runs other programs, reads information, and stores information, according to an operation by the operator. Typical examples of an OS that are conventionally known include Windows (registered trademark) and UNIX (registered trademark). Operation programs that run on such an OS are called application programs. Application programs include not only programs that operate on a predetermined OS, but also programs that cause an OS to take over execution of a part of various types of processes described later, as well as programs that are contained in a group of program files that constitute predetermined application software or an OS.

In the server 1, an ontology construction supporting program is stored in the HDD 104, as an application program. In this regard, the HDD 104 functions as a storage medium that stores therein the ontology construction supporting program.

In each of the client terminals 2, an ontology construction program is stored in the HDD 104, as an application program. In this regard, the HDD 104 functions as a storage medium that stores therein the ontology construction program.

Also, generally speaking, the application programs to be installed in the HDD 104 included in the server 1 and each of the client terminals 2 can be recorded in one or more storage media 110 including various types of optical disks such as CD-ROMs and Digital Versatile Disks (DVDs), various types of magneto optical disks, various types of magnetic disks such as flexible disks, and media that use various methods such as semiconductor memories, so that the operation programs recorded on the storage media 110 can be installed into the HDD 104. Thus, the storage media 110 that are portable, like optical information recording media such as CD-ROMs and magnetic media such as Floppy Disks (FDs), can also be each used as a storage medium for storing therein the application programs. Further, it is also acceptable to install the application programs into the HDDs 104 after obtaining the application programs from an external source via, for example, the communication controlling device 106.

In the server 1, when the ontology construction supporting program that operates on the OS is run, the CPU 101 performs various types of computation processes and controls the functional units in an integrated manner, according to the ontology construction supporting program. On the other hand, in each of the client terminals 2, when the ontology construction program that operates on the OS is run, the CPU 101 performs various types of computation processes and controls the functional units in an integrated manner, according to the ontology construction program. Within the various types of computation processes performed by the CPU 101 included in the server 1 and each of the client terminals 2, characteristic processes according to the present embodiment will be explained below.

By following the ontology construction program, each of the client terminals 2 outputs, via a Graphic User Interface (GUI), data received from the server 1 to the displaying unit 107. Each of the client terminals 2 also receives, via the GUI, data and commands based on operations and settings that have been performed and configured by the operator via the input unit 108 on screens displayed on the displaying unit 107, and further transmits the received data and commands to the server 1. More specifically, when the user has selected data that serves as an ontology construction target via the input unit 108 on a screen displayed on the displaying unit 107, the client terminal 2 outputs the selected data to the server 1. In addition, each of the client terminals 2 allows the user to browse, on the displaying unit 107, candidates for properties and extraction classes to be re-used that are presented by the server 1 with respect to the data. Each of the client terminals 2 also receives a user operation performed on the presented candidates through the input unit 108.

Figure 3:
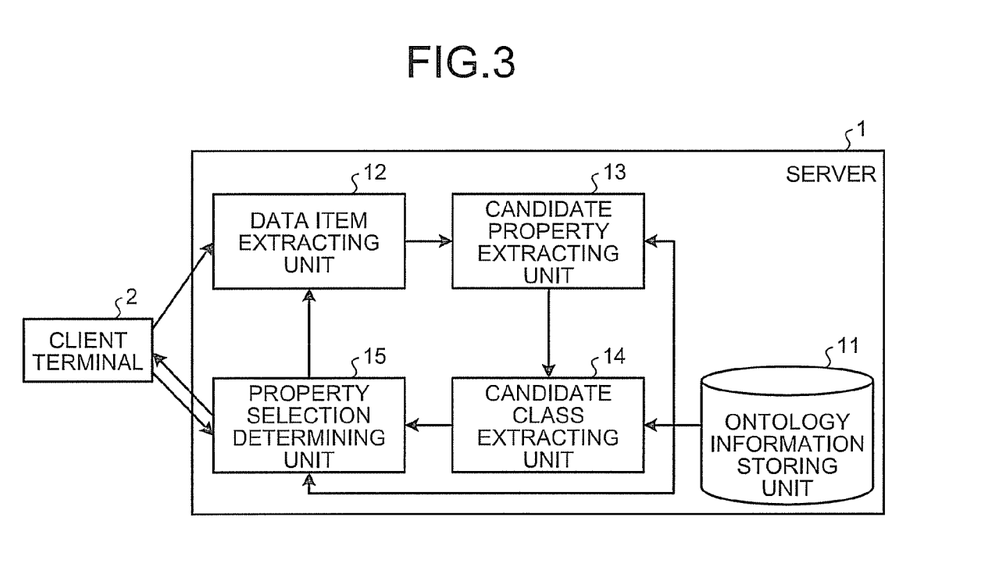
FIG. 3 is a block diagram illustrating a functional configuration of the ontology construction supporting system.

On the other hand, as shown in FIG. 3, the server 1 functions as an ontology construction supporting apparatus by following the ontology construction supporting program. The server 1 includes: an ontology information storing unit 11; a data item extracting unit 12; a candidate property extracting unit 13; a candidate class extracting unit 14; and a property selection determining unit (including a primary property-selection determining unit and a secondary property-selection determining unit) 15.

The ontology information storing unit 11 manages ontologies to which the user is able to refer freely.

Figure 4:
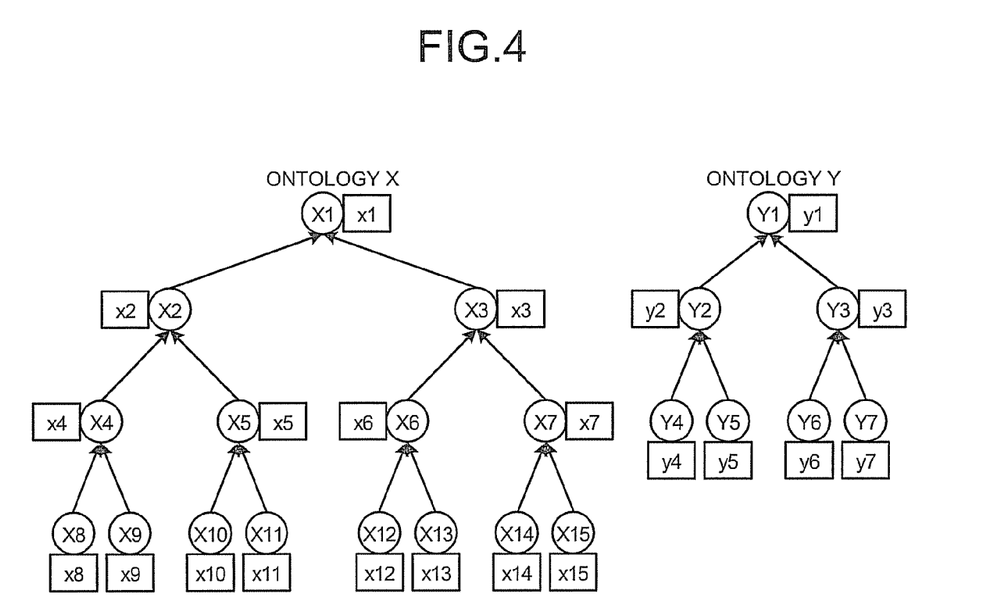
FIG. 4 is a conceptual drawing illustrating examples of hierarchical ontologies.

Next, hierarchical ontologies of which the information is managed in the ontology information storing unit 11 will be explained. Each of the hierarchical ontologies has a tree structure in which the classes are arranged in a hierarchical manner. In this situation, each of the classes expresses a concept such as "manufactured products" or "automobiles". Each of the classes has a plurality of properties with which the class is characterized. One of the characteristics of hierarchical ontologies is that the properties defined on a class are inherited, in an object-oriented manner, by its all the subclasses, i.e., by all the classes in the partial hierarchical level whose root is it. Also, in hierarchical ontologies, in terms of the inheritance levels, each of all the classes from which the properties are inherited are often referred to as a "parent class" or a "direct superclass", whereas each of all the classes that inherit the properties are often referred to as a "child class" or a "direct subclass". Accordingly, in the description of the present embodiment, those terms are used in the same meanings as explained above. In FIG. 4, which is explained later, an inheritance relationship is expressed in a tree structure by connecting the classes that are in the inheritance relationship to each other with a solid line in such a manner that the arrowhead points to the direct superclass that is positioned one level above each of its subclasses.

Also, in hierarchical ontologies, in each of the classes, data that is written according to the properties of the class is stored as an element. In hierarchical ontologies, all of the data of a subclass is also data of its superclasses. However, when the data of a subclass is referred to from one of its superclasses, it is possible to refer to only the values of the properties that the superclass has. In addition, in commonly-used hierarchical ontologies, it is often the case that only the classes which have no subclasses have data; however, the present embodiment is not limited to this example. Another arrangement in which the other classes also have data is applicable to the present embodiment.

FIG. 4 is a conceptual drawing illustrating examples of hierarchical ontologies. In FIG. 4, as the examples of hierarchical ontologies, an ontology X that has fifteen classes and an ontology Y that has seven classes are shown. Each of these ontologies is a hierarchical ontology in which the relationship between a class and one of its subclasses is represented with a solid-line arrow of which the arrowhead points to the parent class.

In FIG. 4, one property is defined in each of the classes. For example, a property x1 is defined in a class X1, whereas a property x2 is defined in a class X2. Also, as explained above, the property defined in a class is inherited by its subclasses. For example, the class X4 has, in addition to a property x4 defined in the class X4, the properties defined in its superclasses that are, namely, the property x1 defined in the class X1 and the property x2 defined in the class X2. Each of the other classes also inherits properties defined in their superclasses.

In the hierarchical ontologies shown in FIG. 4, the class hierarchies are expressed by using simple trees; however, the structure of the class hierarchies is not limited to the one expressed by using simple trees. For example, any other structures of class hierarchies are applicable, such as a concept of "multiple inheritance" where a class has a plurality of parent classes that are positioned one level above the class or a concept of "partial inheritance" that is formed with a relationship to import a number of properties, although it is not a parent-child relationship in a strict sense.

Each of the ontologies managed in the ontology information storing unit 11 does not necessarily have to be a hierarchical ontology. Each of the ontologies may be a flat ontology that is in a special form of a class hierarchy and does not have any hierarchical levels. In other words, it is acceptable if none of the classes is a subclass of another class, and each of all the classes is independent from any other classes.

As explained above, the ontology information storing unit 11 that manages the ontologies includes a class table that stores therein information of the classes in the ontologies and a property table that stores therein information of the properties in the ontologies.

Figure 5:
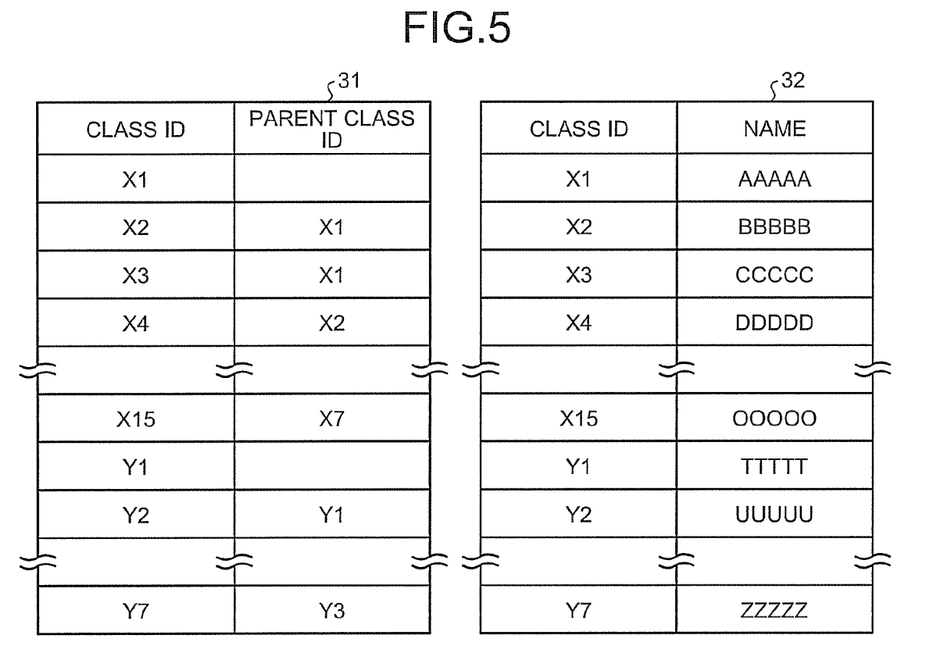
FIG. 5 is a schematic drawing illustrating an example of a class table.

First, the class table will be explained. FIG. 5 is a schematic drawing illustrating an example of the class table. The class table shown in FIG. 5 stores therein information of the classes in the two ontologies shown in FIG. 4 (i.e., the ontology X and the ontology Y). As shown in FIG. 5, the class table includes a class hierarchy table 31 and a class information table 32. The class hierarchy table 31 stores therein the data records consisting of pairs of the ID of a class and the ID of its parent class. The class information table 32 stores therein the data records consisting of pairs of the ID of a class and its name. With this arrangement, by referring to the information stored in the records in the tables, it is possible to identify information such as the name of a specific class in one of the ontologies, and also a parent class of a specific class.

In the present embodiment, it is assumed that the ID of each class in two ontologies is unique. Accordingly, the information for the two ontologies (i.e., the ontology X and the ontology Y) is collectively managed; however, the present invention is not limited to this example. In the case where the ID is not unique, it is acceptable to use another method where one class table is prepared for each of the ontologies or where internal IDs are used for identifying the classes.

Further, according to the present embodiment, only the names are provided as the information of the classes; however, another arrangement is acceptable in which other types of information are provided. Furthermore, it is also acceptable to use other types of information in the processes explained below.

Figure 6:
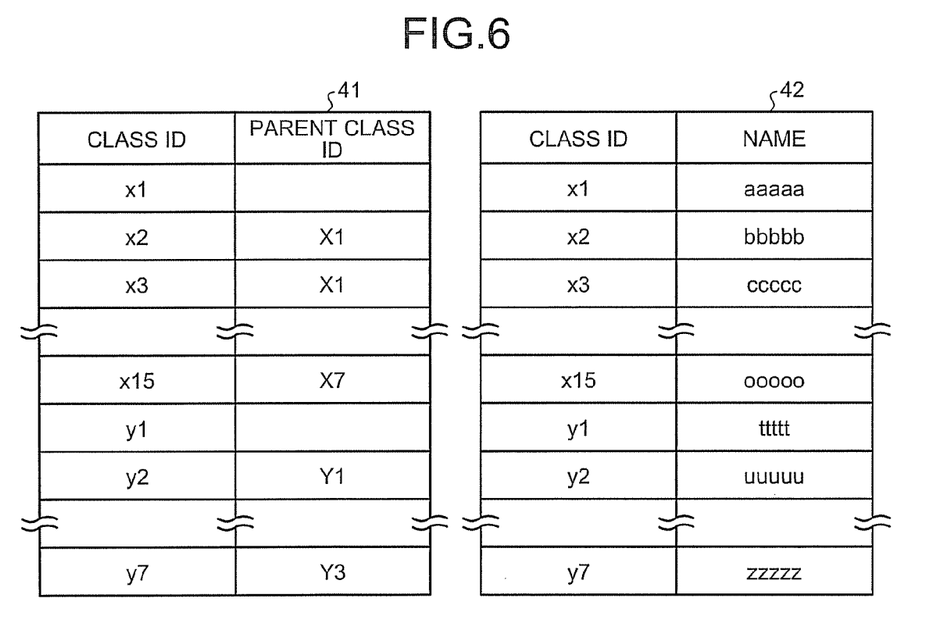
FIG. 6 is a schematic drawing illustrating an example of a property table.

Next, the property table will be explained. FIG. 6 is a schematic drawing illustrating an example of the property table. The property table shown in FIG. 6 stores therein, in the form of a table, the data records of information of the properties in the two ontologies shown in FIG. 4 (i.e., the ontology X and the ontology Y). As shown in FIG. 6, the property table includes an owned-property table 41 and a property information table 42. The owned-property table 41 stores therein the data records of pairs of the ID of a property and its definition class. The property information table 42 stores therein the data records of pairs of the ID of a property and its name. With this arrangement, by referring to the information stored in the records in the tables, it is possible to identify information such as the name of a specific property, and also a class that has the specific property.

In the present embodiment, the properties and all of the classes that each have any of the properties are stored while being kept in correspondence with one another; however, the present invention is not limited to this example. As long as it is possible to obtain the same information, it is acceptable to use another method in which, for example, a subclass stores therein, in a partially omitted manner, the properties that its superclass has, so that the subclass refers to the properties by using hierarchy information stored in the class table.

Also, in the present embodiment, like the classes, it is assumed that the ID of each property in two ontologies is unique; however, in the case where the ID is not unique, it is acceptable to use another method where one table is prepared for each of the ontologies or where internal IDs are used for identifying the properties.

Further, according to the present embodiment, only the names are provided as the information of the properties; however, another arrangement is acceptable in which other types of information are provided. Furthermore, it is also acceptable to use other types of information in the processes explained below.

Next, the data item extracting unit 12, the candidate property extracting unit 13, the candidate class extracting unit 14, and the property selection determining unit 15 will be explained in detail, with reference to the flowchart in FIG. 7 in which a procedure in an ontology construction supporting process is shown.

Figure 7:
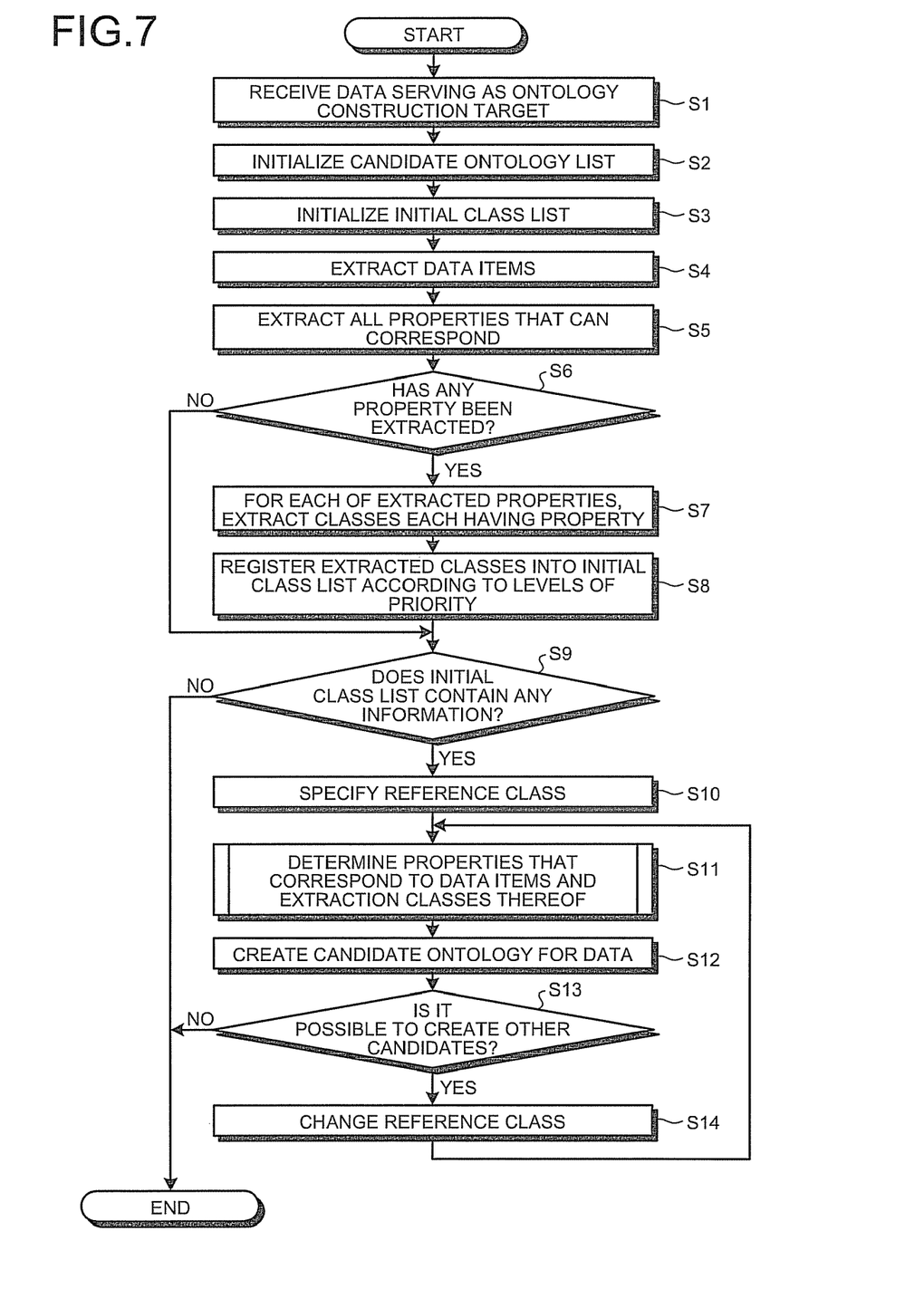
FIG. 7 is a flowchart of a procedure in an ontology construction supporting process.
Figure 8:
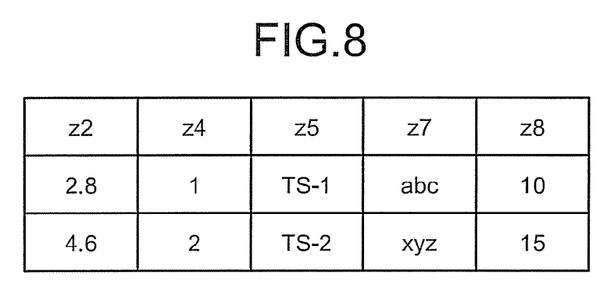
FIG. 8 is a schematic drawing illustrating an example of data that serves as an ontology construction target.

As shown in FIG. 7, when the data item extracting unit 12 has received data set including data items from any of the client terminals 2 (step S1), the data item extracting unit 12 initializes a candidate ontology list for the data set (step S2). FIG. 8 is a schematic drawing illustrating an example of the data set. As shown in FIG. 8, the target data set includes five data items (z2, z4, z5, z7, and z8) and their values. In the present embodiment, the data that is expressed in a table format is used as an example; however, the method according to the present invention is not limited to this example. As long as the each data in the data set is represented as the set of pairs of a data item and its value, the data may be expressed in any other format.

The data item extracting unit 12 initializes an initial class list (step S3), so that it is possible to register therein the classes with which extraction is started. The data item extracting unit 12 also extracts all the data items from the data, and forwards the extracted data items to the candidate property extracting unit 13 (step S4). In this situation, the initial class list denotes a list of classes with which the extraction is started, the list of classes being used when ontology candidates to be presented to the user are created.

For each of the data items received from the data item extracting unit 12, the candidate property extracting unit 13 extracts properties (i.e., candidate properties) that can correspond to the data item, while using all of the referable ontologies that are managed in the ontology information storing unit 11 (step S5). In this situation, in the case where no properties that can correspond to the data items have been extracted (step S6: No), it is not possible to create any ontology for the data. Thus, the process is terminated. On the other hand, in the case where one or more properties that can correspond to any of the data items have been extracted (step S6: Yes), information is forwarded to the candidate class extracting unit 14, the forwarded information being made up of units each of which shows a different one of the extracted data items together with all of the properties that can correspond to the data item.

Figure 9:
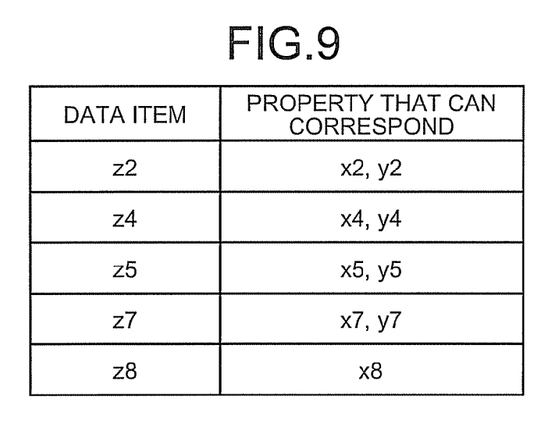
FIG. 9 is a schematic drawing illustrating an example of information forwarded from a candidate property extracting unit to a candidate class extracting unit.

FIG. 9 is a schematic drawing illustrating an example of the information forwarded from the candidate property extracting unit 13 to the candidate class extracting unit 14. The example in FIG. 9 shows information in which each of the data items is combined with the properties that can correspond to the data item. This information has been obtained after the data serving as an ontology construction target shown in FIG. 8 is input, and the properties that can correspond to the data items in the data are extracted from the ontologies shown in FIG. 4.

Subsequently, when the candidate class extracting unit 14 has received, from the candidate property extracting unit 13, the information (see FIG. 9) in which each of the data items is combined with the properties that can correspond to the data item, the candidate class extracting unit 14 extracts, for each of the extracted properties, classes each of which has the property, by using the ontology information managed in the ontology information storing unit 11. The candidate class extracting unit 14 then combines the extracted classes with the properties (step S7) and forwards the created information in which the data items, the properties that can correspond to the data items, and the extraction candidate classes are combined together to the property selection determining unit 15.

Figure 10:
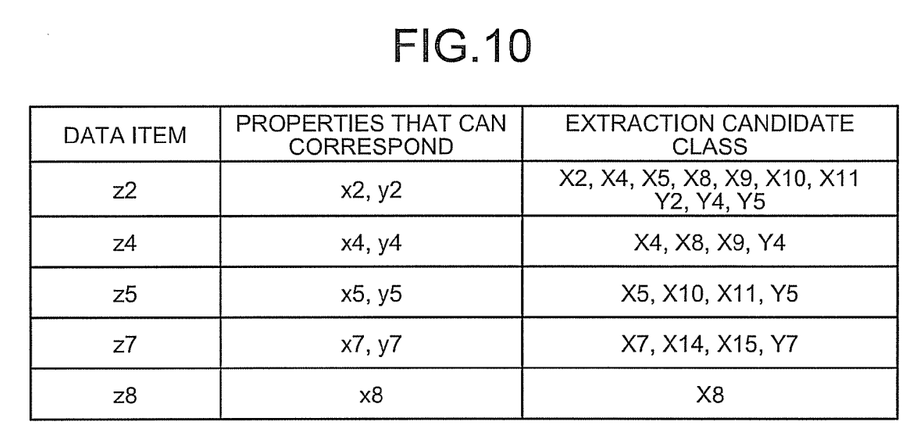
FIG. 10 is a schematic drawing illustrating an example of information forwarded from the candidate class extracting unit to a property selection determining unit.

FIG. 10 is a schematic drawing illustrating an example of the information forwarded from the candidate class extracting unit 14 to the property selection determining unit 15. The example in FIG. 10 shows the information in which the data items, the properties that can correspond to the data items, and the extraction candidate classes are combined together. This information has been obtained as a result of extracting the classes each having one or more of the properties shown in FIG. 9 that can correspond to the data items, from the ontologies shown in FIG. 4. For example, as shown in FIG. 10, with regard to the properties x4 and y4 that can correspond to the data item z4, the classes X4, X8, and X9 each of which has the property x4 are extracted from the ontology X shown in FIG. 4, and also the class Y4 that has the property y4 is extracted from the ontology Y shown in FIG. 4, so that the classes X4, X8, X9, and Y4 are combined with the data items and the properties as the extraction candidate classes.

After that, when the property selection determining unit 15 has received, from the candidate class extracting unit 14, the information in which the data items, the properties that can correspond to the data items, and the extraction candidate classes are combined together (see FIG. 10), the property selection determining unit 15 extracts the extraction candidate classes in descending order of the number of times each of them appears (hereinafter, "the number of times of appearance") and registers the extracted extraction candidate classes into the initial class list (step S8). For example, in the example shown in FIG. 10, the class X8 in the ontology X appears the largest number of times. Thus, the class X8 is the first element in the initial class list. In this situation, in the case where the initial class list is empty (step S9: No), there is no class that serves as an extraction destination candidate, and it is not possible to create an ontology for the data. Thus, the process is terminated. On the other hand, in the case where some information has been registered in the initial class list (step S9: Yes), the process proceeds to step S10, and the process is continued.

In addition, the property selection determining unit 15 determines a reference class according to the levels of priority within the initial class list (step S10). After that, the property selection determining unit 15 automatically extracts the most appropriate property for each of the data items and a candidate for an extraction class for the property, while using the reference class as a starting position (step S11).

Figure 11:
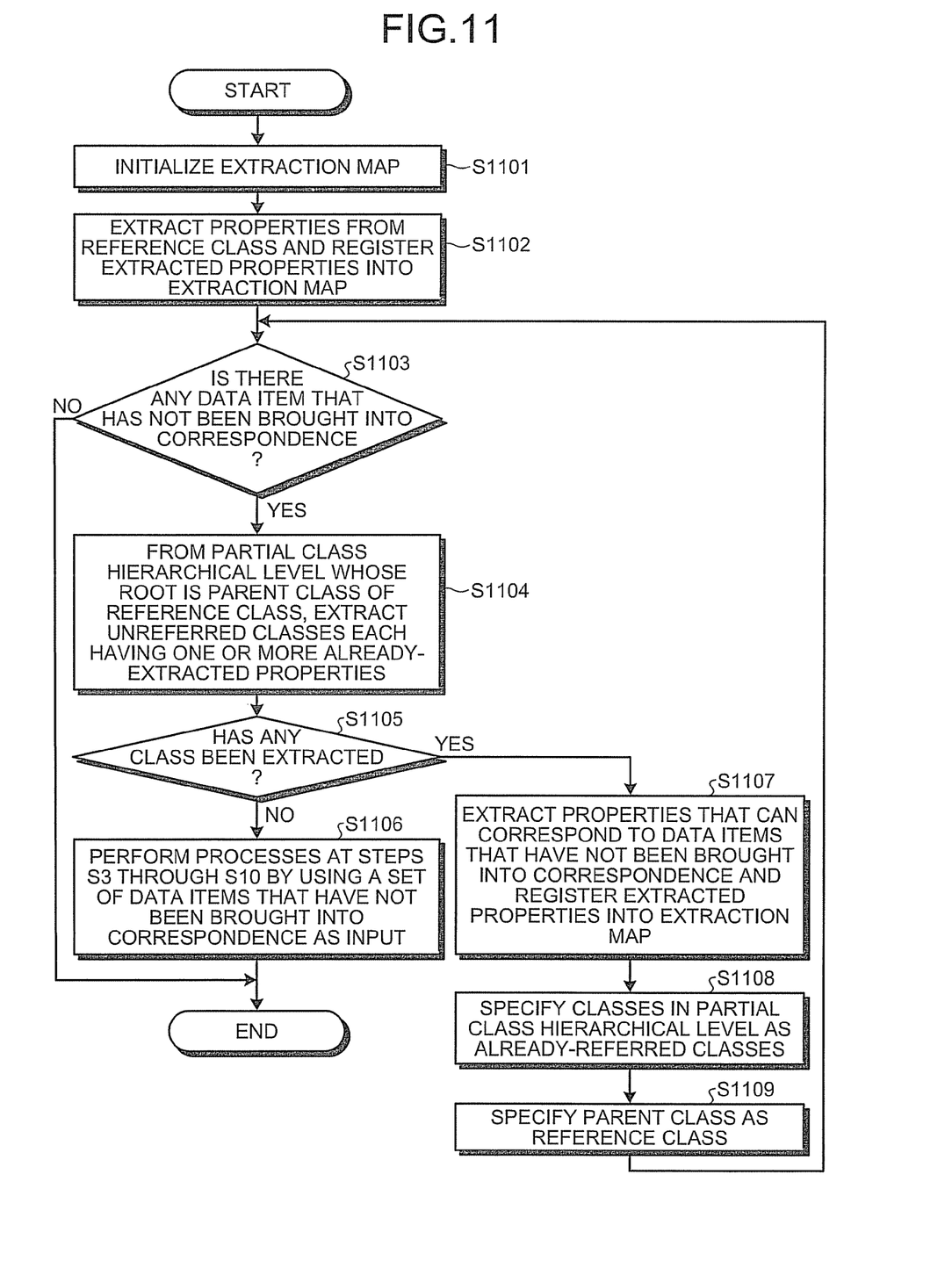
FIG. 11 is a flowchart of a procedure in the process performed at step S11.

Next, the process at step S11 will be explained in detail, with reference to the flowchart in FIG. 11. First, as shown in FIG. 11, an extraction map used for storing therein extracted properties and extraction classes for the data items in correspondence with the reference class is initialized (step S1101). After that, from the properties that the reference class has, a properties that can correspond to each of the data items are extracted, so that the extracted properties are registered into the extraction map, while the reference class is indicated as the extraction class thereof (step S1102). Thus, a primary property-selection determining unit is realized.

Figure 12:
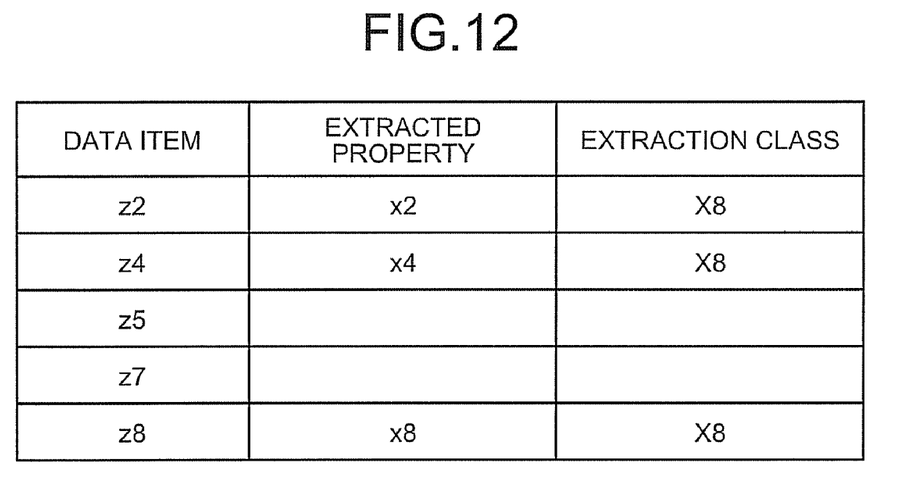
FIG. 12 is a schematic drawing illustrating an example of an extraction map.

FIG. 12 is a schematic drawing illustrating an example of the extraction map. The extraction map shown in FIG. 12 corresponds to the example in which the properties are extracted while the class X8 is used as the reference class in the example shown in FIG. 10. In the extraction map shown in FIG. 12, the properties x2, x4, and x8 have been extracted as the properties that can respectively correspond to the data items z2, z4, and z8 shown in FIG. 10 and have been registered into the extraction map. Also, the class X8 serving as the reference class has been registered into the extraction map, as the extraction class of the extracted properties.

Next, a process performed by a secondary property-selection determining unit to determine a property and an extraction class for each of the data items of which the properties have not yet been determined in the process described above will be explained.

First, in the case where there are one or more data items that have not been brought into correspondence (step S1103: Yes), from the classes that constitute a partial class hierarchical level whose root is the parent class that is one level above the reference class, all unreferred classes each of which has one of the properties that have been extracted during or before the immediately preceding process are extracted (step S1104). In this situation, in the initial state, any classes other than the reference class are considered as "unreferred classes".

Next, in the case where no unreferred class has been extracted, (step S1105: No), the processes at steps S3 through S10 are performed while the data items that have not been brought into correspondence are used as the inputs, so that the properties of these data items can be extracted (step S1106). The result of the processes and the extraction map are merged.

On the other hand, in the case where one or more unreferred classes have been extracted (step S1105: Yes), from the unreferred classes, properties that can correspond to the data items that have not been brought into correspondence are extracted, so that the class information and the property information are registered into the extraction map (step S1107). In this situation, in the case where there are two or more property extraction destination candidate classes, a property is extracted from each of the candidate classes by using the same policy as the one used at step S1107. On the other hand, in the case where the unreferred classes include no class that has a property that can correspond to the data items that have not been brought into correspondence, the process proceeds to the next step. In the case where there are two or more classes that can be extracted, an arrangement is acceptable in which a higher priority is given to such classes among the two or more classes that can be extracted that are positioned closer to the reference class, in terms of the hierarchical level.

After the process at step S1107 has been completed, all the classes in the partial class hierarchical level that have been referred to in the process at step S1107 are specified as already-referred classes (step S1108). The parent class that is one level above the reference class is now specified as the reference class (step S1109), and the process returns to step S1103.

In the case where there is no data item that has not been brought into correspondence after the process at step S1102 or the process at step S1109 has been performed (step S1103: No), the process is ended.

Figure 13:
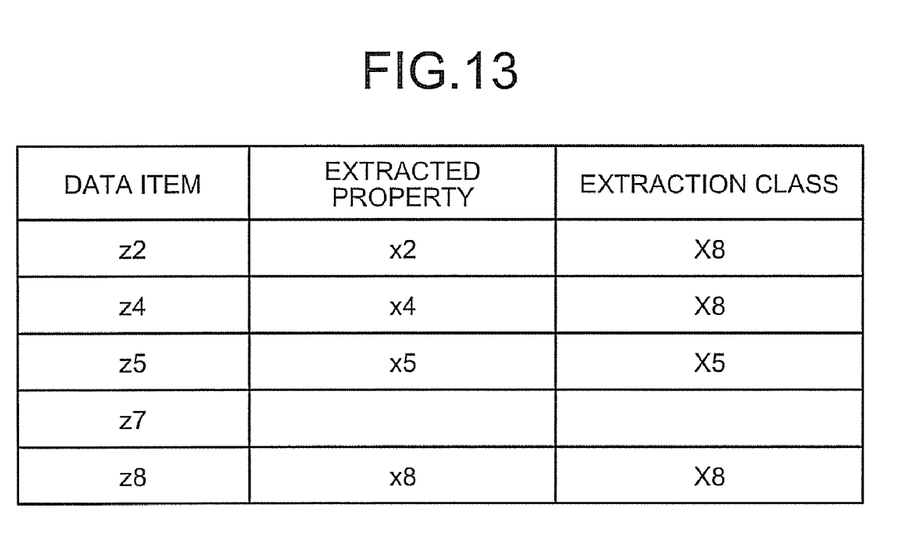
FIG. 13 is a schematic drawing illustrating another example of the extraction map.

Shown in FIG. 13 is a result of having extracted the property that corresponds to the data item z5 by following the procedure described above, with regard to the data item z5 that had not been brought into correspondence in the situation shown in FIG. 12.

First, the class X8, which has been specified as the reference class in the process at step S10, is specified as an already-referred class. After that, according to the process at step S1103, out of the unreferred classes that belong to the partial class hierarchical level whose root is the parent class X4 positioned one level above the class X8, classes each of which has one or more of the three properties (i.e., the properties x2, x4, and x8) that have been extracted in the process at step S1102 are selected. As a result, the classes X4 and X9 each of which has the properties x2 and x4 are selected. In this situation, based on the table shown in FIG. 10, it is understood that neither X4 nor X9 has properties that can correspond to the data items z5 and z7 that have not been brought into correspondence. Thus, no property is extracted. Next, according to the process at step S1108, the classes that constitute the partial class hierarchical level to which the class X4 belongs are specified as already-referred classes. In addition, according to the process at step S1109, the class X4 is now specified as the reference class.

After that, the process returns to step S1103 so that, out of the partial class hierarchical level whose root is the parent class X2 that is positioned one level above the reference class X4, classes each of which has one or more of the properties (i.e., the properties x2, x4, and x8) that have been extracted in the process at step S1102 are selected. As a result, the classes X2, X5, X10, and X11 each of which has the property x2 are selected. In this situation, based on the table shown in FIG. 10, it is understood that the classes X5, X10, and X11 each have a property that can correspond to the data item z5 which has not been brought into correspondence, but the classes X10 and X1 are included in the class X5 in terms of the class hierarchy. Thus, the class X5 is extracted. Alternatively, for the purpose of presenting a larger number of candidates to the user, another arrangement is acceptable in which all of these classes are selected as candidates and are presented to the user after the remaining processes are performed. As a result of the process described above, as shown in FIG. 13, the property x5 is extracted out of the class X5 with respect to the data item z5.

Next, as for the data item z7 that has not been brought into correspondence, no property that can correspond to the data item has been found in the processes described above. Thus, the process regarding the data item z7 is continued. More specifically, according to the process at step S1108, the classes that constitute the partial class hierarchical level whose root is the class X2 are specified as already-referred classes. After that, according to the process at step S1109, the class X2 is now specified as the reference class. After that, the process returns to step S1103 so that, out of the classes that constitute the partial class hierarchical level whose root is the parent class X1 that is positioned one level above the reference class X2, unreferred classes each of which contains one or more of the properties (i.e., the properties x2, x4, and x8) that have been extracted in the process at step S1102 are selected. In the present example, there is no such class in the ontology X shown in FIG. 4. Thus, the process is terminated.

Figure 14:
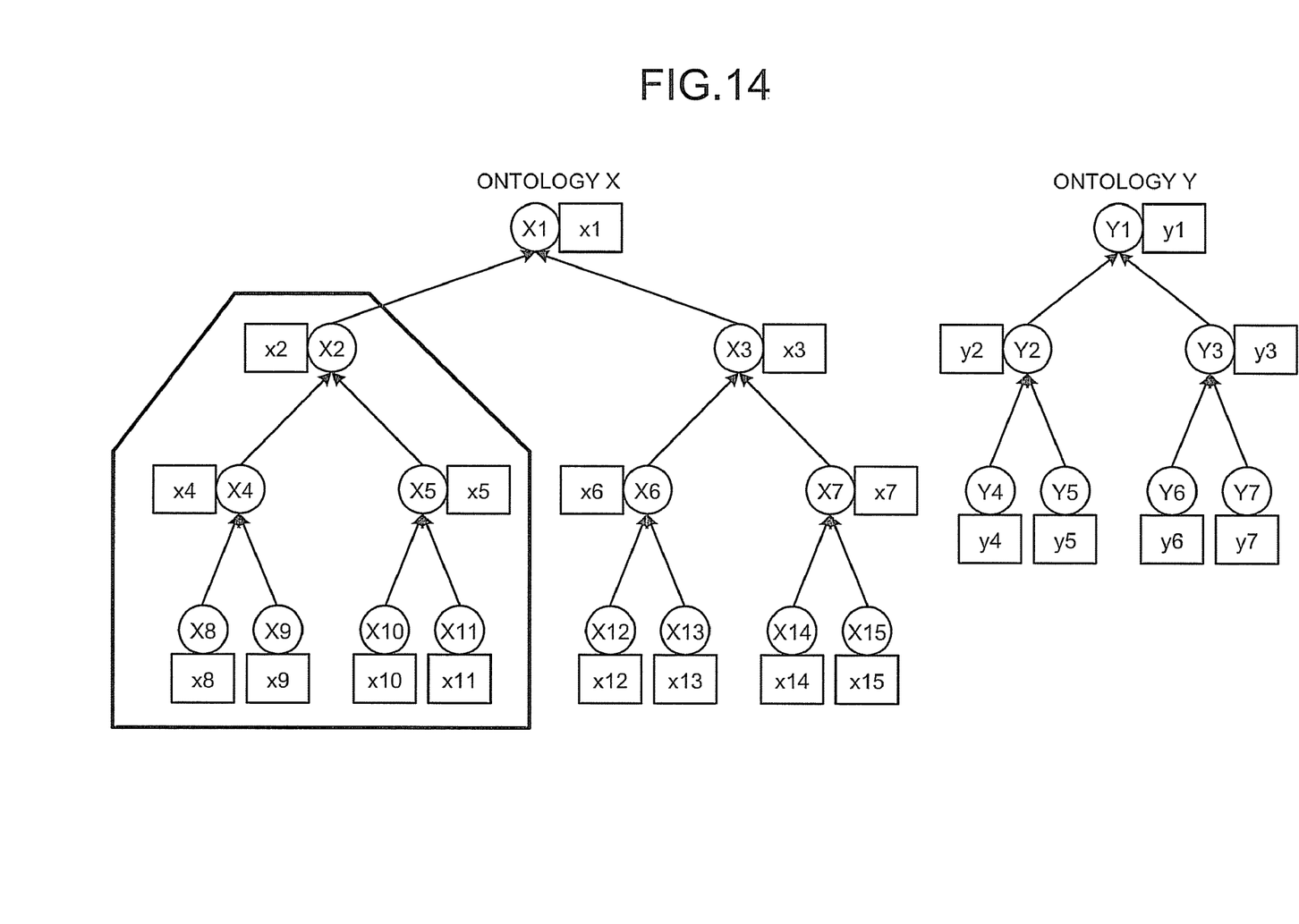
FIG. 14 is a conceptual drawing for explaining a range of classes that are extraction candidates from the ontology shown in FIG. 4.

In FIG. 14, the solid line indicates a range of classes that have been selected as the extraction candidates, out of the ontologies X and Y shown in FIG. 4, the first time the process was performed. As shown in FIG. 14, when the method according to the present invention is used, it is possible to extract a large number of properties that have a high level of relevance, out of the range of classes that is automatically defined in an object-oriented manner.

For the data item z7 that still has not been brought into correspondence even after the process was performed the first time, the process is performed again according to the process at step S1106. As for the data serving as the ontology construction target shown in FIG. 8, the data item z7 is the only data item that has not been brought into correspondence. Thus, properties are extracted by using the classes X7 and Y7 each of which has the data item z7 as the extraction destinations, and the extraction map and the results of the processes described above are merged.

When the process is performed the first time, in the case where there are two or more classes all of which equally have the largest number of times of appearance, it is acceptable to process all these classes. Alternatively, it is acceptable to narrow down the targets by determining their levels of priority based on, for example, the number of times each of the classes has been referred to or the number of pieces of data managed in a server. Further alternatively, another arrangement is acceptable in which a threshold value for the largest value of the number of times of appearance is specified by the user or the system, so that all the classes that exceed the threshold value are processed.

Lastly, according to the extraction map that has been created as a result of the processes described above, a candidate ontology for the data is created and added to the candidate ontology list (step S12).

Figure 15:
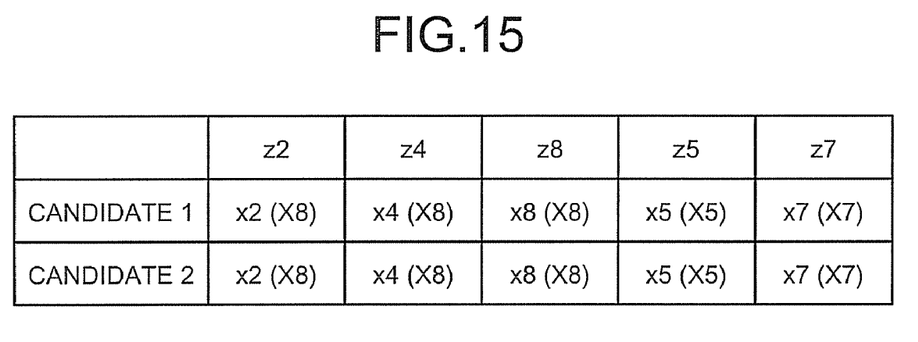
FIG. 15 is a schematic drawing illustrating an example of a candidate ontology list.

Shown in FIG. 15 is an example of the candidate ontology list that is eventually created with respect to the input data, by applying the method according to the present invention to the data serving as an ontology construction target shown in FIG. 8. In FIG. 15, it is shown that the property that corresponds to each data item has been extracted from the class identified with the class ID shown in the parentheses. Shown in the table in FIG. 15 are two candidates that have been created by merging the result of the process performed the first time with the result of the process performed the second time. These candidates are presented to the user through the displaying unit 107 included in the client terminal 2.

In this situation, of the initial class list that has been created as a result of the processes at steps S3 through S8, for each of the classes that were not specified as the reference class in the process at step S10, it is judged whether it is possible to create one or more other candidates (step S13).

In the case where it is possible to create one or more other candidates (step S13: Yes), another class is specified as the reference class (step S14), so that the process at step S11 is performed and the result of the process is added to the candidate ontology list.

On the other hand, in the case where it is not possible to create any other candidates (step S13: No), the process is ended, and the candidate ontology list is presented to the user through the displaying unit 107 included in the client terminal 2.

In the case where any of the classes has the same level of priority as the reference class, or where a criterion such as the threshold value specified in advance by the user or the system is satisfied, or where the user has requested that more candidates should be additionally presented, the processes are repeated so that more candidate ontologies are added.

By having an arrangement in which the initial class list is presented to the user at the time when the initial class is created so that the user is able to select a reference class, it is expected that the processes are performed in such a manner that the preference of the user is reflected.

As explained above, according to the present embodiment, when an ontology is to be constructed for a target data by re-using existing ontologies, it is possible to determine the properties that correspond to the data items in the data serving as the ontology construction target and the extraction classes of the properties as the property extraction destination candidates of the ontology to be constructed, from an aspect of the structure of the class hierarchy according to an object-oriented method or an aspect of the levels of relevance with other properties. Thus, it is possible to re-use even a fine difference in the meanings among the properties in the classes. Consequently, it is possible to provide a support for constructing an effective ontology, while reducing the load on the user.

Conventionally, one of the problems has been that it is difficult to re-use a standard ontology, which is re-used manually, unless the user is conversant with the structure of the standard ontology. However, when the method according to the present embodiment is used, the user needs to refer to only the properties of the classes that are presented as the candidates. Thus, the user does not need to trace the class hierarchy while searching for individual properties. Consequently, it is easy for the user to construct ontologies.

Further, according to the conventional method for bringing ontologies into correspondence, the extraction destinations in the class hierarchy are not taken into consideration. Thus, another problem is that the information about the meanings given to the properties by the classes is missing. However, when the method according to the embodiment described above is used, it is possible to automatically determine appropriate extraction classes, from the aspect of the structure of the class hierarchy and based on the level of relevance with other properties. Thus, it is possible to re-use even a fine difference in the meanings among the properties in the classes.

In addition, even in the case where there are two or more standard ontologies, by narrowing down the extraction classes, it is possible to reduce the range within which the extraction destinations disperse. Consequently, because the information sources are concentrated, the maintenance manageability of the created ontologies is expected to be improved.

In the embodiment described above, it is assumed that the present invention is applied to a server-client system; however, the present invention is not limited to this example. It is acceptable to embody the present invention in a stand-alone form in which the ontology construction supporting system is not connected to a network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ontology construction supporting apparatus comprising:

an ontology information storing unit that stores one or more ontologies, each of the ontologies containing classes obtained by systematically classifying knowledge or a concept, and being capable of correlating data written according to a property as an attribute of the respective class with each of the classes;

a data item extracting unit that extracts a data item from target data for an ontology construction accompanied by a plurality of data items;

a candidate property extracting unit that extracts candidate properties corresponding to the data items, from the one or more ontologies;

a candidate class extracting unit that extracts candidate classes each of which has one or more of the candidate properties, from the one or more ontologies;

a primary property-selection determining unit that determines properties corresponding to the data items related to the target data for an ontology construction from a reference class determined according to the number of times of appearance among the candidate classes and the reference class that is extraction classes of the properties as ontology candidates, from a reference class determined according to priority levels among the candidate classes; and a secondary property-selection determining unit that, in the case when there is a data item for which a corresponding property has not been determined is undetermined by the primary property-selection determining unit, extracts classes each of which has one or more of the properties that have been determined by the primary property-selection determining unit by using the each class determined by the primary property-selection determining unit as the reference class, extracts, from the extracted classes, a class having a property corresponding to the data item for which the corresponding property has not been determined data items that have not been brought into correspondence by the primary property-selection determining unit, and determines a property that corresponds to the data item for which the corresponding property has not been determined data items that have not been brought into correspondence by the primary property-selection determining unit and an extraction class of the property, as ontology candidates.

2. The apparatus according to claim 1, wherein, when extracting the classes each of which has the one or more of the properties determined by the primary property-selection determining unit by using the class determined by the primary property-selection determining unit as the reference class, and when there are a plurality of classes that can be extracted, the secondary property-selection determining unit gives a higher priority to such classes among the plurality of classes that are positioned closer to the reference class in terms of a hierarchical level.

3. The apparatus according to claim 1, wherein the secondary property-selection determining unit recursively performs a process of determining a property that corresponds to the data item for which the corresponding property has not been determined data items that have not been brought into correspondence and an extraction class of the property, by using the class and the property determined by the secondary property-selection determining unit, until the property that corresponds to the data item for which the corresponding property has not been determined data items that have not been brought into correspondence by the primary property-selection determining unit and the extraction class of the property are determined.

4. The apparatus according to claim 3, wherein the secondary property-selection determining unit limits a number of classes to be processed recursively, according to a predetermined threshold value of a number of classes.

5. The apparatus according to claim 1, wherein the priority levels among the candidate classes used by the primary property-selection determining unit are a largest number of times highest frequency of appearance among the candidate classes.

6. The apparatus according to claim 5, wherein the primary property-selection determining unit specifies the priority levels number of times of appearance among the candidate classes according to a number of classes to be referred to, in the case when there are a plurality of the classes which have the largest number of times highest frequency of appearance.

7. The apparatus according to claim 5, wherein the primary property-selection determining unit specifies the priority levels number of times of appearance among the candidate classes according to a number of data of the classes, in the case when there are a plurality of the classes which have the largest number of times highest frequency of appearance.

8. A computer program product having a computer readable medium including programmed instructions for supporting construction of ontologies, wherein the instructions, when executed by a computer, cause the computer to perform:
storing one or more ontologies in a storing unit, each of the ontologies containing classes obtained by systematically classifying knowledge or a concept, and being capable of correlating data written according to a property as an attribute of the respective class with each of the classes;
extracting a data item from target data for an ontology construction accompanied by a plurality of data items;
extracting candidate properties corresponding to the data items from the one or more ontologies;
extracting candidate classes each of which has one or more of the candidate properties from the one or more ontologies;
determining properties corresponding to the data items related to the target data for an ontology construction from a reference class determined according to the number of time of appearance among the candidate classes and the reference class that is extraction classes of the properties as ontology candidates, from a reference class determined according to priority levels among the candidate classes;
extracting classes each of which has one or more of the properties that have been determined by using the each class as the reference class, in the case when there is a data item for which a corresponding property has not been determined is undetermined;
extracting, from the extracted classes, a class having a property corresponding to the data item for which the corresponding property has not been determined data items that have not been brought into correspondence; and
determining a property that corresponds to the data item for which the corresponding property has not been determined data items that have not been brought into correspondence and an extraction class of the property, as ontology candidates.

9. An ontology construction supporting method comprising:
storing one or more ontologies in a storing unit, each of the ontologies containing classes obtained by systematically classifying knowledge or a concept, and being capable of correlating data written according to a property as an attribute of the respective class with each of the classes;
extracting a data item from target data for an ontology construction accompanied by a plurality of data items;
extracting candidate properties corresponding to the data items from the one or more ontologies;
extracting candidate classes each of which has one or more of the candidate properties from the one or more ontologies;
determining properties corresponding to the data items related to the target data for an ontology construction from a reference class determined according to the number of times of appearance among the candidate classes and the reference class that is extraction classes of the properties as ontology candidates, from a reference class determined according to priority levels among the candidate classes;
extracting classes each of which has one or more of the properties that have been determined by using the each class as the reference class, in the case when there is a data item for which a corresponding property has not been determined is undetermined;
extracting, from the extracted classes, a class having a property corresponding to the data item for which the corresponding property has not been determined data items that have not been brought into correspondence; and
determining a property that corresponds to the data item for which the corresponding property has not been determined data items that have not been brought into correspondence and an extraction class of the property, as ontology candidates.

10. An ontology construction supporting apparatus comprising:
an ontology information storing unit that stores one or more ontologies, each of the ontologies containing classes obtained by systematically classifying knowledge or a concept, and being capable of correlating data written according to a property as an attribute of the respective class with each of the classes;
a data item extracting unit that extracts a data item from target data for an ontology construction accompanied by a plurality of data items;
a candidate property extracting unit that extracts candidate properties corresponding to the data items, from the one or more ontologies;
a candidate class extracting unit that extracts candidate classes each of which has one or more of the candidate properties, from the one or more ontologies;
a primary property-selection determining unit that determines properties corresponding to the data items related to the target data for an ontology construction from a reference class determined according to a highest frequency of appearance among the candidate classes and the reference class that is extraction classes of the properties as ontology candidates; and a secondary property-selection determining unit that, when there is a data item which is not bound to any property by the primary property-selection determining unit, extracts classes each of which has one or more of the properties that have been determined by the primary property-selection determining unit using the each class determined by the primary property-selection determining unit as the reference class, extracts, from the extracted classes, a class having a property corresponding to the data items that have not been brought into correspondence by the primary property-selection determining unit, and determines a property that corresponds to the data items that have not been brought into correspondence by the primary property-selection determining unit and an extraction class of the property, as ontology candidates.

* * * * *